US008028194B2

(12) United States Patent
Atluri et al.

(10) Patent No.: US 8,028,194 B2
(45) Date of Patent: Sep. 27, 2011

(54) SEQUENCING TECHNIQUE TO ACCOUNT FOR A CLOCK ERROR IN A BACKUP SYSTEM

(75) Inventors: Rajeev Atluri, Corona, CA (US); Srin Kumar, Andhra Pradesh (IN); Sridhara Lanka, Andhra Pradesh (IN); Jayesh Shah, Andhra Pradesh (IN); Satish Kumar, Andhra Pradesh (IN)

(73) Assignee: Inmage Systems, Inc, Santa Clara, CA (US)

( * ) Notice: Subject to any disclaimer, the term of this patent is extended or adjusted under 35 U.S.C. 154(b) by 294 days.

(21) Appl. No.: 12/179,591

(22) Filed: Jul. 25, 2008

(65) Prior Publication Data
US 2010/0023797 A1    Jan. 28, 2010

(51) Int. Cl.
G06F 11/00 (2006.01)
(52) U.S. Cl. .......... 714/20; 707/787; 707/602; 707/620; 707/624; 707/625; 707/648; 707/672; 714/15; 714/16; 714/19
(58) Field of Classification Search .................. 715/968, 715/229; 714/6, 15, 16, 19, 229; 702/202, 702/204; 707/787
See application file for complete search history.

(56) References Cited

U.S. PATENT DOCUMENTS

| 5,193,181 A | 3/1993 | Barlow et al. |
| 5,313,612 A | 5/1994 | Satoh et al. |
| 5,446,871 A | 8/1995 | Shomler et al. |
| 5,621,882 A | 4/1997 | Kakuta |
| 5,664,189 A | 9/1997 | Wilcox et al. |
| 5,701,480 A * | 12/1997 | Raz ............................. 718/101 |
| 5,805,785 A | 9/1998 | Dias et al. |
| 5,875,479 A | 2/1999 | Blount et al. |
| 5,930,824 A | 7/1999 | Anglin et al. |
| 6,175,932 B1 | 1/2001 | Foote et al. |
| 6,189,016 B1 * | 2/2001 | Cabrera et al. ........................ 1/1 |
| 6,247,141 B1 | 6/2001 | Homberg |
| 6,269,431 B1 | 7/2001 | Dunham |

(Continued)

FOREIGN PATENT DOCUMENTS

JP    2005018738 A  *  1/2005

(Continued)

OTHER PUBLICATIONS

Neel, D., "Symantec Says It'll Put Data on Road to Recovery—New LiveState Une Promises Complete System Restoration," Computer Reseller News, Oct. 4, 2004, 12.

(Continued)

*Primary Examiner* — Robert Beausoliel, Jr.
*Assistant Examiner* — Jeison C Arcos
(74) *Attorney, Agent, or Firm* — Raj Abhyanker, P.C.

(57) ABSTRACT

A method, apparatus, and system of a sequencing technique to account for a clock error in a storage area network are disclosed. In one embodiment, a system of a backup server includes a processing module to examine a data timestamped with a sequence of characters denoting a time according to a clock source, an analysis module to determine that the data has been timestamped at an earlier time than an other data previously received, a substitution module to provide the data an incremental sequence number placed with the data using an algorithm until a new data is received that includes a future timestamp with a later timestamp than the timestamp of the other data, and a storage module to store the data.

22 Claims, 9 Drawing Sheets

U.S. PATENT DOCUMENTS

| | | |
|---|---|---|
| 6,324,654 B1 | 11/2001 | Wahl et al. |
| 6,327,579 B1 | 12/2001 | Crawford |
| 6,490,691 B1 | 12/2002 | Kimura et al. |
| 6,631,374 B1* | 10/2003 | Klein et al. .................. 707/638 |
| 6,647,399 B2 | 11/2003 | Zaremba |
| 6,691,140 B1 | 2/2004 | Bogrett |
| 6,714,980 B1 | 3/2004 | Markson et al. |
| 6,742,139 B1 | 5/2004 | Forsman et al. |
| 6,833,073 B2 | 12/2004 | Agarwal |
| 6,915,315 B2 | 7/2005 | Autrey et al. |
| 6,981,177 B2 | 12/2005 | Beattie |
| 7,093,086 B1 | 8/2006 | Rietschote |
| 7,155,586 B1 | 12/2006 | Wagner et al. |
| 7,165,156 B1 | 1/2007 | Cameron et al. |
| 7,206,911 B2 | 4/2007 | Wolfgang et al. |
| 7,237,021 B2 | 6/2007 | Penney et al. |
| 7,251,749 B1 | 7/2007 | Fong et al. |
| 7,254,682 B1 | 8/2007 | Arbon |
| 7,266,290 B2* | 9/2007 | Shiah et al. .................. 386/125 |
| 2002/0008795 A1 | 1/2002 | Koyama et al. |
| 2002/0124013 A1 | 9/2002 | Loy et al. |
| 2002/0174139 A1* | 11/2002 | Midgley et al. .............. 707/204 |
| 2003/0093579 A1 | 5/2003 | Zimmer et al. |
| 2003/0131253 A1* | 7/2003 | Martin et al. ................ 713/200 |
| 2003/0167380 A1* | 9/2003 | Green et al. ................. 711/136 |
| 2004/0031030 A1 | 2/2004 | Kidder et al. |
| 2004/0093474 A1 | 5/2004 | Lin et al. |
| 2004/0199515 A1 | 10/2004 | Penney et al. |
| 2004/0205390 A1 | 10/2004 | Kanevsky et al. |
| 2004/0267835 A1* | 12/2004 | Zwilling et al. ............. 707/202 |
| 2004/0268067 A1* | 12/2004 | Yamagami ................... 711/159 |
| 2005/0010835 A1 | 1/2005 | Childs et al. |
| 2005/0033930 A1 | 2/2005 | Haruma et al. |
| 2005/0044162 A1 | 2/2005 | Liang et al. |
| 2005/0050386 A1 | 3/2005 | Reinhardt et al. |
| 2005/0055603 A1 | 3/2005 | Soran et al. |
| 2005/0131900 A1* | 6/2005 | Palliyll et al. ................ 707/10 |
| 2005/0138090 A1 | 6/2005 | Augenstein et al. |
| 2005/0138204 A1 | 6/2005 | Iyer et al. |
| 2005/0182953 A1 | 8/2005 | Stager et al. |
| 2005/0188256 A1 | 8/2005 | Stager et al. |
| 2005/0198303 A1 | 9/2005 | Knauerhase et al. |
| 2005/0216527 A1* | 9/2005 | Erlingsson .................. 707/202 |
| 2005/0223181 A1 | 10/2005 | Jeppsen et al. |
| 2005/0235016 A1* | 10/2005 | Amano et al. ................ 707/204 |
| 2005/0240792 A1 | 10/2005 | Sicola et al. |
| 2005/0251540 A1* | 11/2005 | Sim-Tang .................... 707/202 |
| 2005/0257085 A1 | 11/2005 | Haustein et al. |
| 2005/0262097 A1 | 11/2005 | Sim-Tang et al. |
| 2005/0262377 A1 | 11/2005 | Sim-Tang |
| 2005/0267920 A1 | 12/2005 | Helliker et al. |
| 2006/0031468 A1 | 2/2006 | Atluri et al. |
| 2006/0047714 A1 | 3/2006 | Anderson et al. |
| 2006/0114497 A1 | 6/2006 | Anderson et al. |
| 2006/0149793 A1 | 7/2006 | Kushwah et al. |
| 2006/0155912 A1 | 7/2006 | Singh et al. |
| 2006/0218434 A1 | 9/2006 | Solhjell |
| 2007/0038998 A1 | 2/2007 | Fries |
| 2007/0168404 A1 | 7/2007 | Nakamura et al. |
| 2007/0204104 A1* | 8/2007 | Wan et al. .................... 711/114 |
| 2007/0244938 A1 | 10/2007 | Michael et al. |
| 2007/0294568 A1* | 12/2007 | Kanda et al. ................. 714/6 |
| 2008/0091744 A1* | 4/2008 | Shitomi et al. ............... 707/204 |

FOREIGN PATENT DOCUMENTS

| | | | |
|---|---|---|---|
| WO | WO-2004021677 A1 | 3/2004 | |

OTHER PUBLICATIONS

Kador, J., Open Middleware: The Next Generation in Distributed Computing, Midrange Systems, Nov. 25, 1994, v.7, n. 22, p. S12(4).

Data Protection—Perform Zero Downtime Backups [ online Jan. 29, 2009]. Retrieved from the Internet URL: http://stage.hp.resource.com/sbso/bus_protect/data_protect/zero_downtime.

HP Open View Storage Data Protector 5.1 Software [online] [retrieved on Jan. 29, 2009]. Retrieved from the Internet URL: http://www.hp.com/products1/storage/pdfs/media/OVDPds2.pdf.

Storagecraft Technology Corporation: Protecting Windows Servers and PCs with Fast and Reliable Online Backup and Bare Metal Recovery Solutions [online] [retrieved on Jan. 29, 2009]. Retrieved from the Internet URL: http://www.rmwtug.org/Talks/ShadowStor/ShadowProtectdsheet.pdf.

U.S. Appl. No. 11/405,236, filed Oct. 18, 2007, Michael et al.
U.S. Appl. No. 11/438,401, filed Dec. 6, 2007, Atluri et al.
U.S. Appl. No. 11/438,036, filed Nov. 22, 2007, Atluri.
U.S. Appl. No. 11/229,289, filed Jan. 12, 2006, Atluri.

* cited by examiner

| RECEIVED TIMESTAMP 400 | TIMESTAMP VALUE 412 (PROBLEM) | STORED TIMESTAMP 414 (SOLUTION OF A PARTICULAR EMBODIMENT) | RELATIVE TIME STORED TIMESTAMP 416 (SOLUTION OF ANOTHER PARTICULAR EMBODIMENT) |
|---|---|---|---|
| 1ST RECEIVED TIMESTAMP 402 | 15:45 | 15:45 | 15:45 |
| 2ND RECEIVED TIMESTAMP 404 | 15:46 | 15:46 | 15:46 RELATIVE TIME INTERVAL VALUE 422 |
| 3RD RECEIVED TIMESTAMP 406 | 12:30 | 15:46 L SEQUENCE 1 (E.G. INCREMENTAL NUMBER) 418 | 15:46 + 5 NANOSECONDS RELATIVE TIME INTERVAL VALUE 424 |
| 4TH RECEIVED TIMESTAMP 408 | 12:37 | 15:46 L SEQUENCE 2 420 | 15:46 + 10 NANOSECONDS |
| 5TH RECEIVED TIMESTAMP 410 | 15:49 | 15:49 | 15:49 |

410 404 410
410 404 —— IF B>A THEN USE B AS TIME STAMP,
ELSE USE A + (L SEQUENCE 1 OR RELATIVE TIME)
404 418 422

6TH RECEIVED TIMESTAMP 426

FIGURE 4

| RECEIVED TIMESTAMP 400 | TIMESTAMP VALUE 412 | INCREMENTAL NUMBER STORED TIMESTAMP 414 |
|---|---|---|
| 1ST RECEIVED TIMESTAMP 402 | 15:45 | 15:45 |
| 2ND RECEIVED TIMESTAMP (A) 404 | 15:46 | 15:46 |
| 3RD RECEIVED TIMESTAMP 406 | 12:30 | 15:46 L SEQUENCE 1 418 |
| 4TH RECEIVED TIMESTAMP 408 | 12:37 | 15:46 L SEQUENCE 2 420 |
| 5TH RECEIVED TIMESTAMP (B) 410 | 15:49 | 15:49 |
| 6TH RECEIVED TIMESTAMP 426 | 11:12 | 15:49 L SEQUENCE 1 418 |
| 7TH RECEIVED TIMESTAMP 528 | 15:60 | 15:60 |

RESET TO FIRST SEQUENCE 418

FIGURE 5

| RECEIVED TIMESTAMP 400 | STORED TIMESTAMP 602 | ASSOCIATED EQUIPMENT TIMESTAMP 604 | CHRONOLOGICAL SEQUENCE 606 | ALGORITHMICALLY GENERATED SEQUENCE NUMBER 610 |
|---|---|---|---|---|
| 1ST RECEIVED TIMESTAMP 402 | 15:45 | --- | 15:45 | 200 |
| 2ND RECEIVED TIMESTAMP 404 | 15:46 | --- | 15:46 | 215 |
| 3RD RECEIVED TIMESTAMP 406 | 15:46 L SEQUENCE 1 418 | EQUIVALENT TIMESTAMP 410 15:46 = 15:465 L SEQUENCE 1 418 | 15:465 | 217 |
| 4TH RECEIVED TIMESTAMP 408 | 15:46 L SEQUENCE 2 420 | 15:46 = 15:470 L SEQUENCE 2 420 | 15:470 | 250 |
| 5TH RECEIVED TIMESTAMP 410 | 15:49 | --- | 15:49 | 258 |

CHRONOLOGICAL SEQUENCE 608

SEQUENCING TECHNIQUE TO ACCOUNT FOR A CLOCK ERROR IN A BACKUP SYSTEM

FIELD OF TECHNOLOGY

This disclosure relates generally to an enterprise method, a technical field of software and/or hardware technology and, in one example embodiment, to a sequencing technique to account for a clock error in a storage area network.

BACKGROUND

A computer system (e.g., a storage area network, a local area network, etc.) may use a time log technique (e.g., maintaining a chronological record of a data processing event) as a data backup and/or restore technique in a data backup system (e.g., a peripheral data storage device, etc.). As a data (e.g., an information in a form suitable for processing by a computer) is written to a primary storage system (e.g., a storage disk array, a logical unit number system, etc.) a copy of the data may be written to a secondary storage system (e.g., a storage disk array, a logical unit data storage system, etc.). A time log (e.g., a chronological record of a data processing operation that may be used to construct or reinstate a historical or alternative version of a computer file) of a change to the data in the computer system may be sent to the secondary storage system and/or may identify when the change to the data occurred with a time stamp according to a clock source (e.g., a signal used to coordinate an action of a set of circuits). In the event of a disaster and/or a loss of the data stored elsewhere in the computer system or in the primary storage system, the data may be recovered from the secondary storage system. A recovery of the data may be accomplished by applying the time log to locate the appropriate data with the time stamp in the secondary storage system. The copy of the data may be written to a storage repository (e.g., a single volume several storage volumes, a set of files on a file system, etc.).

In order to retrieve the data stored to a single point in time across several storage volumes (e.g., could be stored in parallel), a user may need to identify a proper time and/or sequence the data was written onto the storage volumes. The data may be marked with a time stamp when it is placed onto the storage volume in order that it may later be recovered according to the proper sequence. The recovery of the data from the secondary storage system depends on an accuracy of the clock source. The clock source may inherently be unreliable (e.g., it may arbitrarily return to an earlier point of time, time keeping as queued, etc.). Consequently, the time stamp identifying the data on the storage volume or volumes may not be sufficient and/or accurate. This can prevent the system in identifying the proper sequence of the data stored in the secondary storage system. Thus, the time log technique as a method of data backup may become unreliable.

SUMMARY

A method, apparatus, and system of a sequencing technique to account for a clock error (e.g. a clock error may included skew) in a storage area network are disclosed. In one aspect, a system of a backup server includes a processing module to examine a data timestamped with a sequence of characters denoting a time according to a clock source, an analysis module to determine that the data has been timestamped at an earlier time than an other data previously received, a substitution module to provide the data an incremental sequence number placed with the data using an algorithm until a new data is received that includes a future timestamp with a later timestamp than the timestamp of the other data, a storage module to store the data, and a retrieval module to recover one or more volumes to the same point in time.

The sequence number may be a global sequence number that may increment across sources of the data. The sequence number may also be changed based on an event in a network associated with the backup server. The event may be a write I/O being received and/or a shutdown event in the network. The global sequence number may be used for new data received when the timestamp of the data timestamped with the sequence of numbers is unavailable. The sequence number may be an incremental sequence number generated by incrementing the timestamp of the data previously received.

The system may include a setting module to reset the incremental sequence number to a first value (e.g. could be equal or greater than a timestamp of the last write received) when the new data may be received that may include the future timestamp with the later timestamp than the timestamp of the other data. The sequence number may be a relative time interval value placed with the timestamp of the other data denoting a relative time interval according to an independent clock source. The storage module may store the data in a continuous data protection repository for a threshold value such that the data may be persistently stored. The threshold value may be an amount of time, an allocated storage space, and/or an available storage space.

The system may include an association module to associate the incremental sequence number with an equivalent timestamp. The system may also include a sequence module to algorithmically determine a chronological sequence and/or arrange a set of data based on successive ones of the incremental sequence number and/or another set of data not based on successive ones of the incremental sequence number according to a chronological sequence.

The system may include a collation module to collate the sets of data based on successive ones of the incremental sequence number of storage modules and/or the sets of data not based on successive ones of the incremental sequence number of the storage modules according to the chronological sequence. The system may also include a retrieval module to access the data stored according to the chronological sequence through a lookup algorithm that may examine the timestamp of the other data to determine an accurate location of a target data in a data stream between the other data and a sequence numbers to recover within a volume and/or across volumes to the accurate location of the target data, and when a granularity of an increment of the timestamp cannot be used to delineate an order of an I/O, then the sequence number may be also used to determine the accurate location.

In another aspect, a system of a backup server includes an interface module to collect a data packet with a timestamp from a computer network, a monitor module to determine if the timestamp may be received from the computer network in a proper chronological sequence by comparing the timestamp to a previously received timestamp, an identifier module to affix a relative sequential identifier to the previously received timestamp when a subsequent timestamp is received from the computer network with a chronological value that is less than the previously received timestamp and until a later timestamp is received from the computer network with a chronological value that is greater than the previously received timestamp, and a write module to store the data packet to a data storage medium.

The system may include a comparison module to equate the timestamp with the relative sequential identifier with a corresponding timestamp. The system may also include an assembly module to assemble a set of data packets with timestamps with the relative sequential identifier with a set of data packets with timestamps without the relative sequential identifier into the proper chronological sequence. In addition, the system may include a synchronization module to chronologically synchronize the data changes into the proper chronological sequence.

In yet another aspect, a method of storing data includes examining a data timestamped with a sequence of characters denoting a time according to a clock source, determining that the data has been timestamped at an earlier time than an other data previously received, providing the data an incremental sequence number (e.g., may be an incremental number placed with the data and/or may be a relative time interval value placed with the timestamp of the other data denoting a relative time interval according to an independent clock source) generated by incrementing the timestamp of the other data previously received until a new data is received that includes a future timestamp with a later timestamp than the timestamp of the other data, and storing the data.

The method may include resetting the incremental sequence number to a first value when the new data may be received that may include the future timestamp with the later timestamp than the timestamp of the other data. The method may include associating the incremental sequence number with an equivalent timestamp. The method may also include algorithmically determining a chronological sequence and/or arranging a set of data based on successive ones of the incremental sequence number and/or another set of data not based on successive ones of the incremental sequence number according to a chronological sequence. In addition, the method may include retrieving the data stored according to the chronological sequence.

In a further aspect, a method of a backup server includes algorithmically locating a time stamp time nearest to a user specified time within a set of storage modules, algorithmically mapping a global sequence number with the user specified time, and algorithmically locating a proceeding global sequence number of an incremental sequence of global sequence numbers across other storage modules of the set of storage modules until a set of required global sequence numbers of the storage modules have been identified that correspond to the user specified time.

The method may include using an approximation algorithm to use the global sequence number as an equivalent of a specified number of clock ticks. In addition, the method may include mapping a user specified event to the user specified time.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4 is a table view illustrating difference in timestamp value, stored timestamp, and relative time stored timestamp, according to one embodiment.

FIG. 5 is a table view illustrating received timestamp, timestamp value and incremental number stored timestamp, according to one embodiment.

FIG. 6 is a table view illustrating chronological sequence, according to one embodiment.

Figure 1:
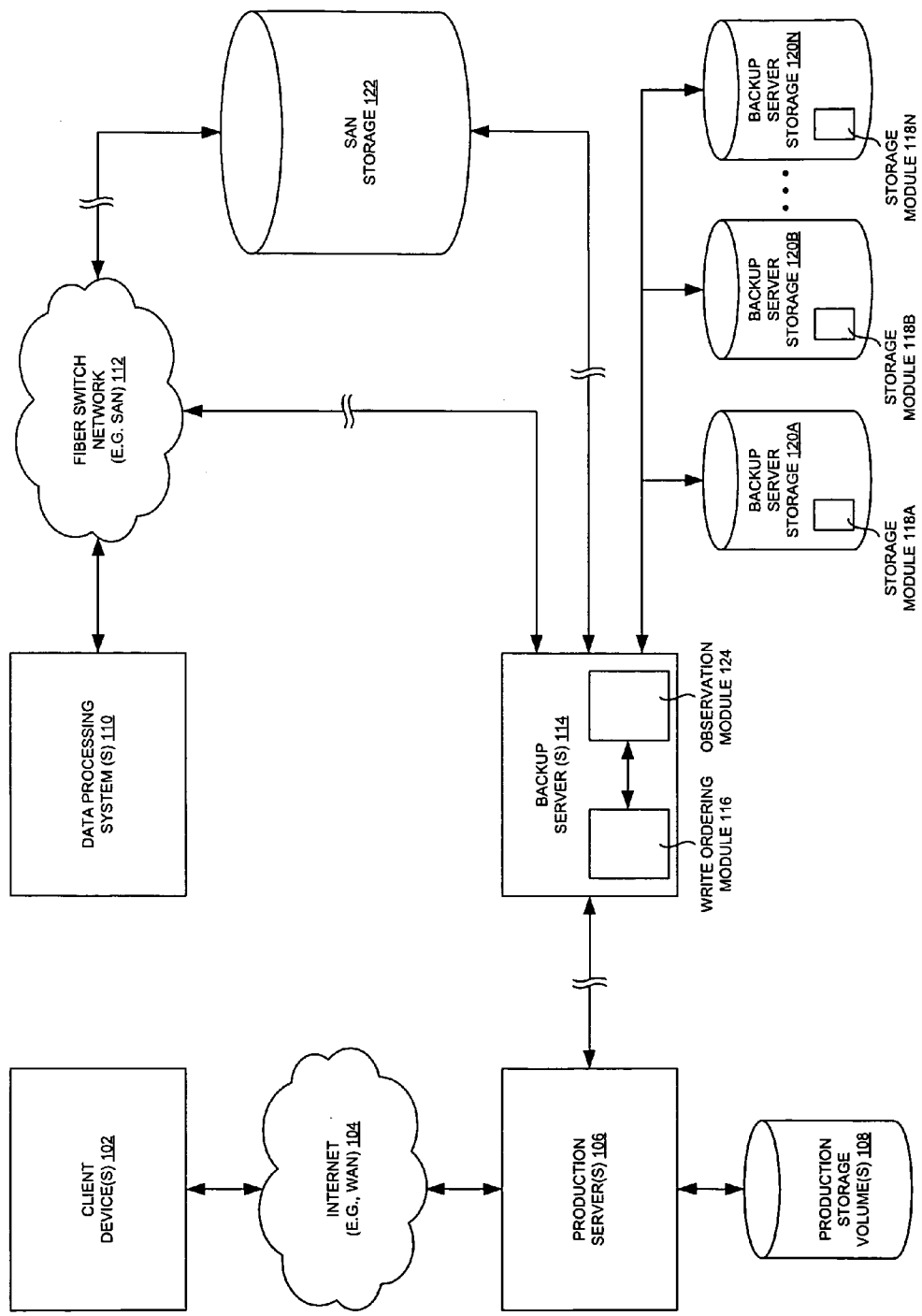
FIG. 1 is a system view of storing and processing a timestamped data using a back up server through a network, according to one embodiment.

Other features of the present embodiments will be apparent from the accompanying drawings and from the detailed description that follows.

DETAILED DESCRIPTION

A method, apparatus, and system of a sequencing technique to account for a clock error in a storage area network are disclosed. Although the present embodiments have been described with reference to specific example embodiments, it will be evident that various modifications and changes may be made to these embodiments without departing from the broader spirit and scope of the various embodiments.

In one embodiment, a system of a backup server (e.g., the backup server 114 of FIG. 1) includes a processing module (e.g., the processing module 200 of FIG. 2) to examine a data timestamped with a sequence of characters (e.g. a sequence of bytes) denoting a time according to a clock source, an analysis module (e.g., the analysis module 202 of FIG. 2) to determine that the data (e.g., facts, figures, information, records, etc.) has been timestamped at an earlier time than an other data previously received, a substitution module (e.g., the substitution module 204 of FIG. 2) to provide the data an incremental sequence number placed with the data using an algorithm until a new data is received that includes a future timestamp with a later timestamp than the timestamp of the other data, and a storage module (e.g., the storage module 118A-N of FIG. 1) to store the data.

In another embodiment, a system of a backup server (e.g., the backup server 114 of FIG. 1) includes an interface module (e.g., the interface module 302 of FIG. 3) to collect a data packet (e.g., Information that may be combined as one so as to be easily transmitted on a network) with a timestamp from a computer network (e.g., through networks such as the fiber switch network 112, LAN, WAN, Bluetooth, WiFi, etc.), a monitor module (e.g., the monitor module 304 of FIG. 3) to determine if the timestamp is received from the computer network in a proper chronological sequence by comparing the timestamp to a previously received timestamp, an identifier module (e.g., the identifier module 306 of FIG. 3) to affix a relative sequential identifier to the previously received timestamp when a subsequent timestamp is received from the computer network with a chronological value that is less than the previously received timestamp and until a later timestamp is received from the computer network with a chronological value that is greater than the previously received timestamp, and a write module (e.g., the write module 308 of FIG. 3) to store (e.g., using the storage module 118A-N of FIG. 1) the data packet to a data storage medium (e.g., SAN storage 122, backup server storage 120A-N).

In yet another embodiment, a method of storing data (e.g., using the storage module 118A-N) includes examining a data timestamped with a sequence of characters denoting a time according to a clock source, determining that the data has been timestamped at an earlier time than an other data previously received, providing the data an incremental sequence number generated by incrementing the timestamp of the other data previously received until a new data is received that includes a future timestamp with a later timestamp than the timestamp of the other data, and storing (e.g., using the storage module 118A-N of FIG. 1) the data.

In further embodiment, a method of a backup server (e.g., the backup server 114 of FIG. 1) includes algorithmically locating a time stamp time nearest to a user specified time within a set of storage modules, algorithmically mapping a global sequence number (e.g., may be using a sequence module 212 of FIG. 1) with the user specified time, and algorithmically locating a proceeding global sequence number of an incremental sequence of global sequence numbers across other storage modules of the set of storage modules until a set of required global sequence numbers of the storage modules have been identified that correspond to the user specified time.

FIG. 1 is a system view of storing and processing a timestamped data using a back up server (e.g., the backup server(s) 114 of FIG. 1) through a network (e.g., such as fiber switch network 112 (SAN), LAN, WAN, etc.), according to one embodiment. Particularly, FIG. 1 illustrates a client device(s) 102, an internet (e.g., WAN) 104, a production server(s) 106, a production storage volume(s) 108, a data processing system (s) 110, a fiber switch network 112 (e.g., SAN, etc.), a backup server (S) 114, a write ordering module 116, a storage module 118A-N, a backup server storage 120A-N, and a SAN storage 122, according to one embodiment.

The client device(s) 102 may be data processing system (e.g., computer, laptop, etc.) that may process (e.g., generate, edit, store, etc.) information. The internet 104 may be a worldwide series of interconnected networks that may allow sharing and/or networking of information in client devices through network. The production server(s) 106 may be a web server that delivers what may be often called the "live site" which may be available to the entire web and/or houses the most recent version of its respective site. The production storage volume(s) 108 may be the database that may include the contents and/or information that may be required for processing of information by the production server(s) 106.

The data processing system(s) 110 (e.g., computers, mobile phones, PDA, server, etc.) may process the information (e.g., data) based on the input data (e.g., may be sent through network, may be input manually, using media, etc.). The fiber switch network (e.g., SAN) 112 may be a set of high-speed fiber switches that may be used for switching in storage networking. The fiber switch network (e.g., SAN) 112 may be used to interconnect different kinds of data storage devices with associated data servers on behalf of a larger network of users. The backup server(s) 114 may be a data processing system (e.g., computer) in a network which may be used to store data (e.g., files, information, codes, etc.) from client machines and/or other servers.

The write ordering module 116 may process (e.g., analyze, determining for timestamp, set, substitute, etc.) the data packets to store the data packets in order (e.g., may be in stored in backup server storage 120A-N). The storage module 118A-N may store the data packets which have been processed in the backup server(s) 114. The backup server storage 120A-N may be a storage device (e.g., hard disk, flash memory) that may store the data packets from the backup server(s) 114. The SAN storage 122 may enable multiple computers across a network to access a common set of storage devices (e.g., may be disk arrays, tapes, optical drives, autoloaders, etc.).

In example embodiment, the client device(s) 102 that may communicate with the internet (e.g., WAN) 104. The production server(s) 106 may communicate with the production storage volume(s) 108 for the presenting the data to the client devices 102 through internet 104. The backup server 114 may interact with the production server 106, fiber switch network 112, the SAN storage 122, and the backup server storage 120A-N to backup data. The backup server 114 may include write ordering module 116.

The production server (S) 106 may communicate with the backup server (S) 114 associated with the write ordering module 116 for backing up information. The backup server (S) 114 may communicate with the fiber switch network (e.g., SAN) 112, the backup server storage 120A-N associated with the storage module 118A-N, and the SAN storage 122. The fiber switch network 112 (e.g., SAN) may communicate with the data processing system(s) 110, the backup server(s) 114 and/or the SAN storage 122 to transfer the data. The backup server(s) 114 may include write ordering module 116 and observation module 124 that may communicate with each other for analyzing the data and/or communicating the data to various other units (e.g., may be in the backup server storage 120A-N, the SAN storage 122, the fiber switch network 112, the production server(s) 106, etc.). The backup server storage 120A-N may store the data obtained from the backup server (s) 114.

In one embodiment, the storage module 118A-N may store the data. The write ordering module 116 may store the data packet to the data storage medium. The storage module 118A-N may store the data in the continuous data protection repository for the threshold value such that the data may be persistently stored. The threshold value may be the amount of time, the allocated storage space, and/or the available storage space.

Figure 2:
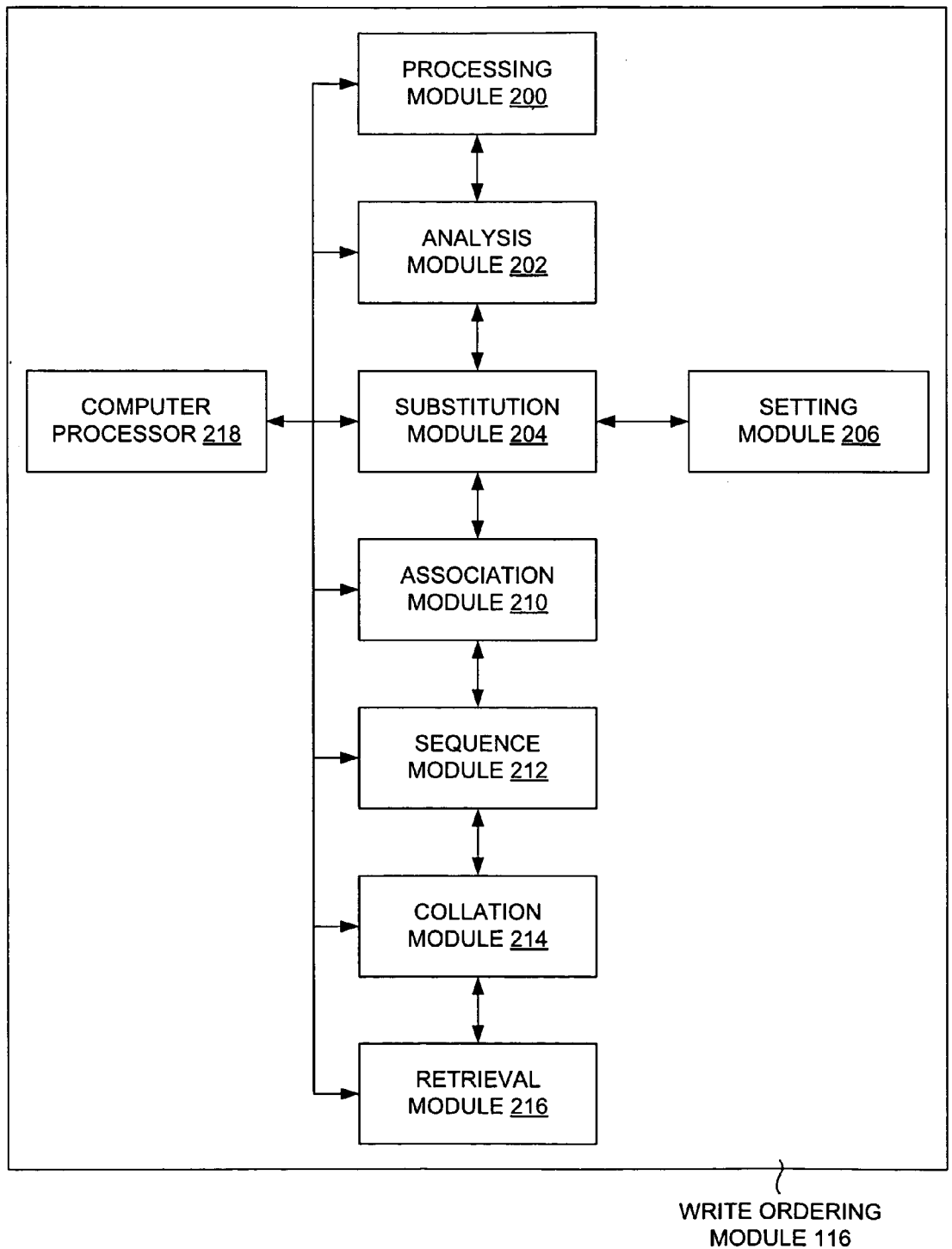
FIG. 2 is an exploded view of a write ordering module, according to one embodiment.

FIG. 2 is an exploded view of the write ordering module 116, according to one embodiment. Particularly, FIG. 2 illustrates a processing module 200, an analysis module 202, a substitution module 204, a setting module 206, an association module 210, a sequence module 212, a collation module 214, a retrieval module 216, and a computer processor 218, according to one embodiment.

The processing module 200 may examine (e.g., check, verify, etc.) the data timestamped (e.g., which may include date, time and/or other information) associated with a sequence denoting a time in relation to a clock source. The analysis module 202 may analyze the data (e.g., information) which may be timestamped (e.g., that may include clock time information) at an earlier time than the previously received data. The substitution module 204 may provide an incremental value stamp which may be generated by incrementing the timestamp of the previously received data until a new data is received that includes a future timestamp with a later timestamp than the timestamp of the other data.

The setting module 206 may reset the incremental sequence number (e.g., to a first value) when the new data is received that includes the future timestamp with the timestamp of the other data denoting a relative time interval according to an independent clock source. The association module 210 may associate the incremental sequence number along with an equivalent timestamp. The sequence module 212 may determine a chronological sequence 608 (e.g., as illustrated in FIG. 6) algorithmically which may arrange a set of data based on successive incremental sequence number. The collation module 214 may collate a set of data based on successive incremental sequence number of the storage module 118A-N and a set of data not based on successive incremental value timestamp of the storage module 118A-N according to a chronological sequence 508 (e.g., indexed sequentially). The retrieval module 216 may retrieve the data stored based on the chronological sequence 508. The computer processor 218 (e.g., the central processing unit (CPU), etc.) may process the data (e.g., that may include the timestamp value) in a system.

In example embodiment, the computer processor 218 that may communicate with the processing module 200, the analysis module 202, the substitution module 204, the association module 210, the sequence module 212, and/or with the collation module b 214. The collation module 214 may communicate with the retrieval module 216. The substitution module 204 that may communicate with the setting module 206.

In one embodiment, the processing module 200 may examine the data timestamped with the sequence of characters denoting the time according to the clock source. The analysis module 202 may determine that the data may have been timestamped at the earlier time than the other data previously received. The substitution module 204 may provide the data the incremental sequence number placed with the data using the algorithm until the new data may be received that may include the future timestamp with the later timestamp than the timestamp of the other data. The sequence number may be the global sequence number that may increment across sources of the data. The sequence number may be changed based on the event in the network associated with the backup server. The event may be the write I/O being received and/or the shutdown event in the network. The global sequence number may be used for new data received when the timestamp of the data timestamped with the sequence of numbers may be unavailable.

The sequence number may be the incremental sequence number generated by incrementing the timestamp of the other data previously received.

The setting module 206 may reset the incremental sequence number to a first value when the new data may be received that may include the future timestamp with the later timestamp than the timestamp of the other data. The sequence number may be the relative time interval value placed with the timestamp of the other data denoting the relative time interval according to the independent clock source.

The association module 210 may associate the incremental sequence number with the equivalent timestamp. The sequence module 212 may algorithmically determine the chronological sequence 608 and/or arrange the set of data based on successive ones of the incremental sequence number and/or another set of data not based on successive ones of the incremental sequence number according to the chronological sequence 608. The collation module 214 may collate the sets of data based on successive ones of the incremental sequence number of the storage module 118A-N and/or the sets of data not based on successive ones of the incremental sequence number of the storage module 118A-N according to the chronological sequence 608. The retrieval module 216 may access the data stored according to the chronological sequence 608 through the lookup algorithm that may examine the timestamp of the other data to determine the accurate location of the target data in the data stream between the other data and the sequence numbers to recover within the volume and/or across volumes to the accurate location of the target data, and when the granularity of the increment of the timestamp cannot be used to delineate the order of the I/O, then the sequence number may also be used to determine the accurate location.

The data timestamped with the sequence of characters denoting the time may be examined (e.g., using the processing module 200 of FIG. 2) according to the clock source. It may be determined (e.g., using the analysis module 202 of FIG. 2) that the data has been timestamped at the earlier time than the other data previously received. The incremental sequence number generated by incrementing the timestamp of the other data previously received may be provided (e.g., using the substitution module 204 of FIG. 2) to the data until the new data may be received that may include the future timestamp with the later timestamp than the timestamp of the other data.

The incremental sequence number may be the incremental number placed with the data. The incremental sequence number (e.g., using the setting module 206 of FIG. 2) may reset to a first value when the new data may be received that may include the future timestamp with the later timestamp than the timestamp of the other data. The incremental sequence number may be a relative time interval value placed with the timestamp of the other data denoting the relative time interval according to the independent clock source.

Figure 3:
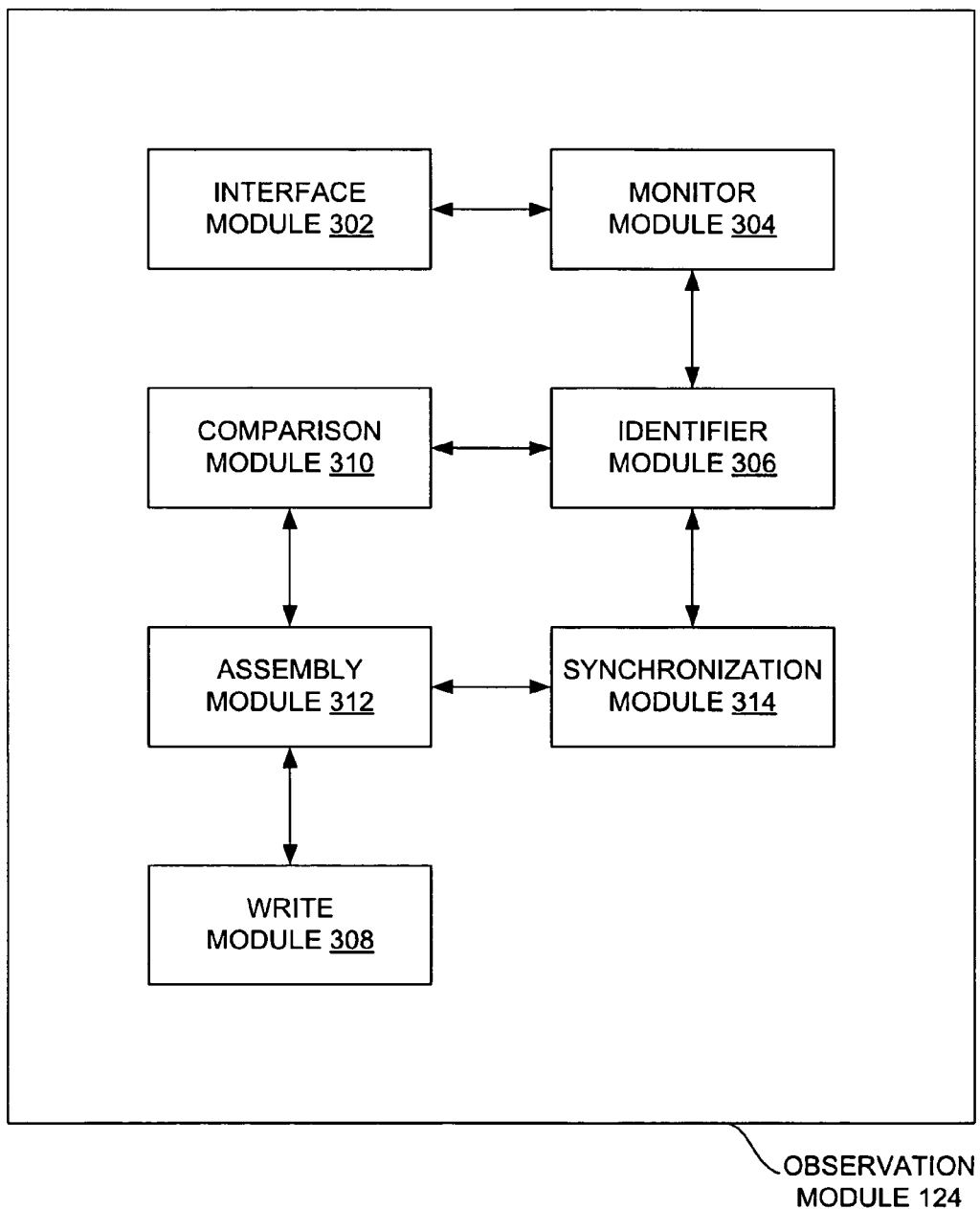
FIG. 3 is an exploded view of the observation module 124, according to one embodiment.

The incremental sequence number may be associated (e.g., using the association module 210 of FIG. 2) with the equivalent timestamp. The chronological sequence 608 and arranging the set of data may be algorithmically determined (e.g., using the sequence module 212 of FIG. 2) based on successive ones of the incremental sequence number and/or another set of data not based on successive ones of the incremental sequence number according to the chronological sequence 608. The data stored may be retrieved (e.g., using the retrieval module 216 of FIG. 2) according to the chronological sequence 608. The retrieval module 216 may access the data stored according to the chronological sequence through the lookup algorithm that may examine the timestamp of the other data to determine the accurate location of the target data in the data stream between the other data and sequence numbers may recover within the volume and/or across volumes to the accurate location of the target data, and when the granularity of the increment of the timestamp cannot be used to delineate the order of the I/O, then the sequence number may also be used to determine the accurate location FIG. 3 is an exploded view of the observation module 124, according to one embodiment. Particularly, FIG. 3 illustrates an interface module 302, a monitor module 304, an identifier module 306, a write module 308, a comparison module 310, an assembly module 312, and a synchronization module 314, according to one embodiment.

The monitor module 304 may determine (e.g., check, verify, etc.) if the timestamp received (e.g., for a data packet) from the computer network (e.g., LAN, WAN, etc.) in a proper chronological sequence (e.g., in a defined order) by comparing the timestamp to a previously received timestamp. The identifier module 306 may to mark (e.g., attach a relative sequential identifier) the previously received timestamp when a subsequent timestamp is received from the computer network with a chronological value that is less than the previously received timestamp and until a later timestamp is received from the computer network with a chronological value that is greater than the previously received timestamp. The write module 308 may store the data packet to a data storage medium. The comparison module 310 may equate the timestamp with the mark (e.g., may be a relative sequential identifier) with a corresponding timestamp. The assembly module 312 may assemble data packets with timestamps with the mark (e.g., may be the relative sequential identifier) with a set of data packets with timestamps without the mark (e.g., may be the relative sequential identifier) into the proper chronological sequence. The synchronization module 314 may synchronize the data packets of data storage mediums chronologically into the proper chronological sequence.

In example embodiment, the interface module 302 may communicate with the monitor module 304. The monitor module 304 may communicate with the identifier module 306. The identifier module 306 may communicate with the comparison module 310 and the synchronization module 314. The comparison module 310 and the synchronization module 314 may communicate with the assembly module 312. The assembly module 312 may communicate with the write module 308, according to one embodiment.

In one embodiment, the interface module 302 may collect a data packet with a timestamp from a computer network. The monitor module 304 may determine if the timestamp may be received from the computer network in a proper chronological sequence by comparing the timestamp to a previously received timestamp. The identifier module 306 may affix a relative sequential identifier to the previously received timestamp when a subsequent timestamp may be received from the computer network with a chronological value that may be less than the previously received timestamp and/or until a later timestamp may be received from the computer network with a chronological value that may be greater than the previously received timestamp.

The write module 308 may store the data packet to a data storage medium. The comparison module 310 may equate the timestamp with the relative sequential identifier with a corresponding timestamp. The assembly module 312 may assemble a set of data packets with timestamps with the relative sequential identifier with a set of data packets with timestamps without the relative sequential identifier into the proper chronological sequence. The synchronization module 314 may chronologically synchronize the data packets of data storage mediums into the proper chronological sequence.

FIG. 4 is a table view illustrating difference in timestamp value, stored timestamp, and relative time stored timestamp, according to one embodiment. Particularly, FIG. 4 illustrates a received timestamp 400, 1$^{st}$ received timestamp 402, 2$^{nd}$ received timestamp (A) 404, 3$^{rd}$ received timestamp 406, 4$^{th}$ received timestamp 408, 5$^{th}$ received timestamp (B) 410, a timestamp value field 412, a stored timestamp field 414, a relative time stored timestamp field 416, L sequence 1 418, L sequence 2 420, a relative time interval value 422, 5 million seconds relative time interval value 424, and 6$^{th}$ received timestamp 426, according to one embodiment.

The received timestamp 400 may be an information in data that may include time details (e.g., a sequence of characters denoting time, etc) associated to the data. The 1$^{st}$ received timestamp 402, the 2$^{nd}$ received timestamp (A) 404, the 3$^{rd}$ received timestamp, the 4$^{th}$ received timestamp 408, and/or the 5$^{th}$ received timestamp (B) 410 may illustrate the different timestamp values (e.g., which may include timestamp value, stored timestamp and/or relative tie stored timestamp) of the data. The timestamp value field 412 (e.g., may be a problem) may illustrate the timestamp (e.g., the time data) associated to the data. The stored timestamp field 414 (e.g., may be a solution of a particular embodiment) may illustrate a stored timestamp data associated to the data.

The relative time stored timestamp field 416 (e.g., may be a solution of another particular embodiment) may be a timestamp that may be stored in relative (e.g., with some reference) to the time of the timestamp value. The L sequence 1 418 (e.g., chronological sequence) may illustrate the timestamp which may be given a sequence number when the clock may run in a reverse order. The L sequence 2 420 may illustrate the timestamp which may be given a sequence number. The relative time interval value 422 may be an incremental sequence number that may be placed with the timestamp of the other data denoting a relative time interval.

The 5 million seconds relative time interval value 424 may be an incremental sequence number of 5 milliseconds that may be placed with the timestamp of the other data denoting a relative time interval. The 6$^{th}$ received timestamp 426 may illustrate the resetting incremental sequence number to a first value when new data is received that includes the future timestamp with the later timestamp than the timestamp of the other data. A condition may be determined where if the 5$^{th}$ received timestamp (B) 410 for a data is greater than the 2$^{nd}$ received timestamp (A) then the 2$^{nd}$ received timestamp (A) 404 may be used as the timestamp else 5$^{th}$ received timestamp (B) 410 added with the L sequence 1 418 in logical operation (e.g., OR operation) with the relative time 422 (e.g., 5 millisecond).

In example embodiment, the received timestamp 400 may illustrate the 1$^{st}$ received timestamp 402, the 2$^{nd}$ received timestamp (A) 404, the 3$^{rd}$ received timestamp 406, the 4$^{th}$ received timestamp 408, the 5$^{th}$ received timestamp (B) 410 in the first column. The timestamp value field 412 (e.g., may be a problem) may illustrate the received timestamp value associated to the received data such as "15:45" in first row, "15:46" in second row, "12:30" in third row, "12:37" in fourth row, and "15:49" in fifth row. The stored timestamp field 414 (e.g., may be a solution of a particular embodiment) may illustrates data timestamp values associated to the data such as "15:45" in first row, "15:46" in second row, "15:46 L sequence 1 (e.g., incremental number) 418" in third row, "15:46 L sequence 2 420 in fourth row, and "15:49" in the fifth row.

The relative time stored timestamp field 416 (e.g., may be a solution of an another particular embodiment) may illustrate the relative time interval value of the stored timestamp such as "15:45" in the first row, "15:46" relative time interval value 422 in the second row, "15:46+5 milliseconds" relative time interval value 424 in the third row, "15:46+10 milliseconds" in fourth row, and "15:49" in the fifth row.

FIG. 5 is a table view illustrating received timestamp, timestamp value and incremental number stored timestamp, according to one embodiment. Particularly, FIG. 5 illustrates the 1$^{st}$ received timestamp 402, the 2$^{nd}$ received timestamp 404, the 3$^{rd}$ received timestamp 406, the 4$^{th}$ received timestamp 408, the 5$^{th}$ received timestamp 410, the timestamp value field 412, the incremental number stored timestamp field 414, the L sequence 1 418, the L sequence 2 420, a 6$^{th}$ received timestamp 426, a 7$^{th}$ received timestamp 528, and incremental number stored timestamp field 414, according to one embodiment.

The 6$^{th}$ received timestamp 426 and the 7$^{th}$ received timestamp 528 may illustrate the different timestamp values of the data. The incremental number stored timestamp field 414 may be the timestamp of the data whose timestamp may be generated by incrementing the timestamp of the other data previously received. The reset to first sequence 418 may illustrate that the timestamp data which whose sequence may be reset whenever there is a shift in clock.

In example embodiment, the value of the timestamp along with incremental number stored timestamp of the received data. The received timestamp 400 may illustrate the 1$^{st}$ received timestamp 402, the 2$^{nd}$ received timestamp 404, the 3$^{rd}$ received timestamp 406, the 4$^{th}$ received timestamp 408, the 5$^{th}$ received timestamp 410, the 6$^{th}$ received timestamp 426 and the 7$^{th}$ received timestamp 528. The timestamp value field 412 may illustrate the received timestamp value associated to the data such as "15:45" in first row, "15:46" in second row, "12:30" in third row, "12:37" in fourth row, "15:49" in fifth row, "11:12" in sixth row, and "15:60" in seventh row. The incremental number stored timestamp field 414 may illustrate "15:45" in first row, "15:46" in second row, "15:46 L sequence 1 418" in third row, "15:46 L sequence 2 420" in fourth row, "15:49" in fifth row, "15:49 L sequence 1 418" in sixth row, and "15:60" in seventh row.

In one embodiment, the data timestamped with a sequence of characters denoting a time may be examined according to a clock source. It may be determined that the data has been timestamped at an earlier time than an other data previously received. The data may be provided an incremental sequence number generated by incrementing the timestamp of the other data previously received until a new data may be received that may include a future timestamp with a later timestamp than the timestamp of the other data.

FIG. 6 is a table view illustrating received timestamp 400 along with chronological sequence 508, according to one embodiment. Particularly, FIG. 6 illustrates the $1^{st}$ received timestamp 402, the $2^{nd}$ received timestamp (A) 404, the $3^{rd}$ received timestamp 406, the $4^{th}$ received timestamp 408, the $5^{th}$ received timestamp 410, the timestamp value field 412, the incremental number stored timestamp field 414, the L sequence 1 418, the L sequence 2 420, and a stored timestamp field 602, associated equipment timestamp field 604, chronological sequence field 606, the chronological sequence 608, and an algorithm generated sequence number field 610, according to one embodiment.

The stored timestamp field 602 may be a timestamp of the data that has been stored in the data. The associated equipment timestamp field 604 may illustrate the associated equivalent timestamp to the existing timestamp. The chronological sequence field 606 may be an arrangement of data algorithmically based on successive data of the incremental sequence number. The algorithm generated sequence number field 610 may illustrate a number for a packet that may be generated by the algorithm (e.g., may be in an incremental sequence) that may enable proper collation.

In example embodiment, the table view of the received timestamp 400, the stored timestamp field 602, the associated equipment timestamp field 604 and the chronological sequence field 606. The received timestamp 400 may include may illustrate the $1^{st}$ received timestamp 402, the $2^{nd}$ received timestamp 404, the $3^{rd}$ received timestamp 406, the $4^{th}$ received timestamp 408, and the $5^{th}$ received timestamp 410. The stored timestamp field 602 may illustrate "15:45" in first row, "15:46" in second row "15:46", L sequence 1 418 in third row, "15:46", L sequence 2 420 in fourth row, and "15:49" in fifth row. The associated equipment timestamp field 604 may illustrate "15:46=15:65" meaning 15:465 may be the timestamp that may be given a sequence (e.g., L sequence 1 418) and 15:65 may be an equivalent timestamp 510 for the L sequence 1 418 in the first row, "15:46=15:470" meaning 15:46 may be the timestamp that may be given a sequence (e.g., L sequence 2 420) and 15:470 may be an equivalent timestamp 510 for the L sequence 2 420 in the second row. The chronological sequence field 606 may illustrate "15:45" in the first row, "15:46" in the second row, "15:465" in the third row, "15:470" in the fourth row and "15:49" in the fifth row. The algorithm generated sequence number field 610 may illustrate "200" in the first row, "215" in the second row, "217" in the third row, "250" in the fourth row, and "258" in the fifth row.

In one embodiment, the chronological sequence field 606 and arranging a set of data may be algorithmically determined based on successive ones of the incremental sequence number and/or another set of data not based on successive ones of the incremental sequence number according to the chronological sequence 508. The data stored may be retrieved according to the chronological sequence 508.

Figure 7:
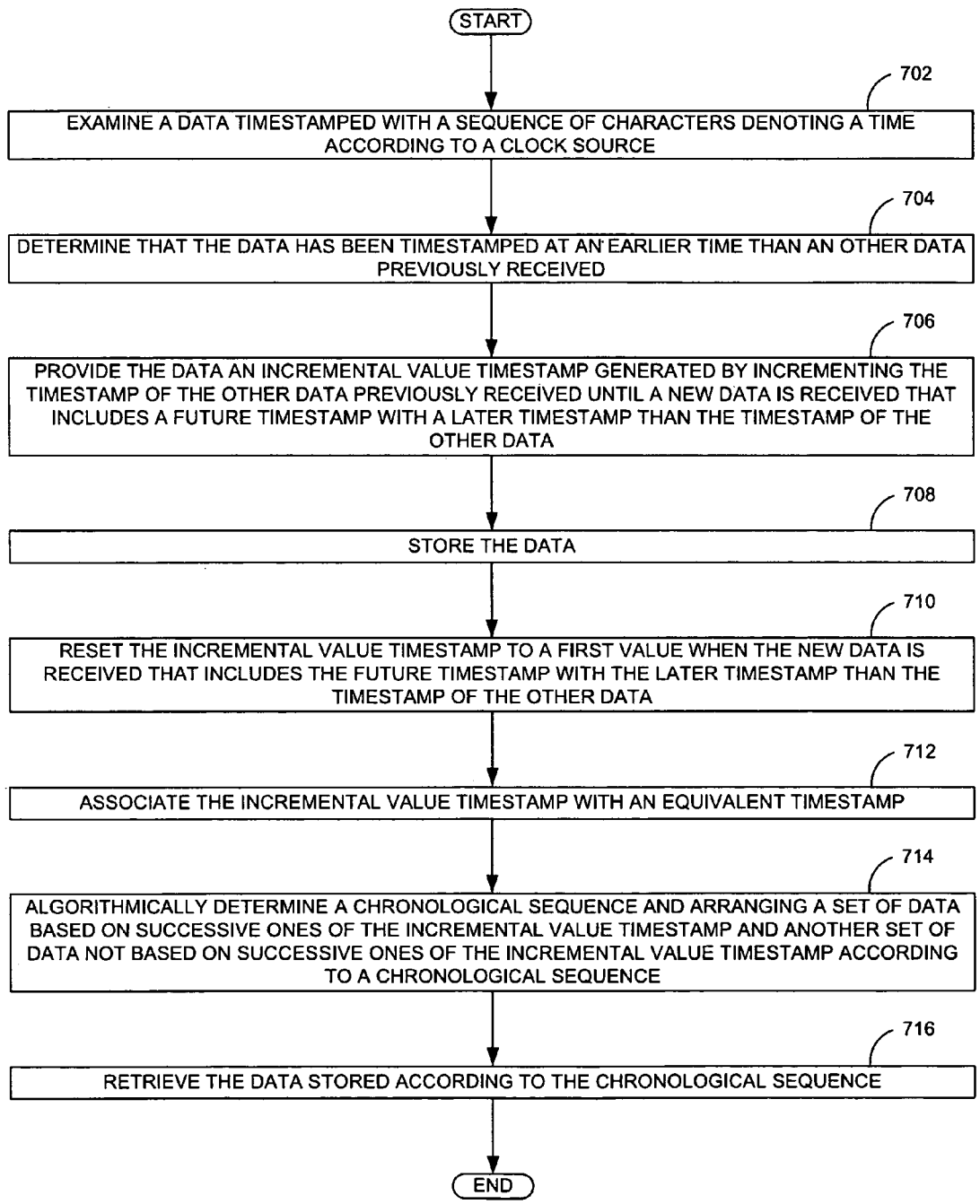
FIG. 7 is a process flow of examining a data timestamped with a sequence of characters denoting a time according to a clock source, according to one embodiment.

FIG. 7 is a process flow of examining a data timestamped with a sequence of characters denoting a time according to a clock source, according to one embodiment. In operation 702, a data timestamped with a sequence of characters denoting a time may be examined (e.g., using the processing module 200 of FIG. 2) according to a clock source. In operation 704, it may be determined (e.g., using the analysis module 202 of FIG. 2) that the data has been timestamped at an earlier time than an other data previously received. In operation 706, the data may be provided (e.g., using the substitution module 204 of FIG. 2) an incremental sequence number generated by incrementing the timestamp of the other data previously received until a new data may be received that may include a future timestamp with a later timestamp than the timestamp of the other data. In operation 708, the data may be stored (e.g., using the storage module 118A-N of FIG. 1).

The incremental sequence number may be an incremental number placed with the data. In operation 710, the incremental sequence number may reset (e.g., using the setting module 206 of FIG. 2) to a first value when the new data may be received that may include the future timestamp with the later timestamp than the timestamp of the other data. The incremental sequence number may be a relative time interval value placed with the timestamp of the other data denoting a relative time interval according to an independent clock source.

In operation 712, the incremental sequence number may be associated (e.g., using the association module 210 of FIG. 2) with an equivalent timestamp. In operation 714, a chronological sequence (e.g., the chronological sequence 608 of FIG. 6) and arranging a set of data may be algorithmically determined (e.g., using the sequence module 212 of FIG. 2) based on successive ones of the incremental sequence number and/or another set of data not based on successive ones of the incremental sequence number according to a chronological sequence (e.g., the chronological sequence 608 of FIG. 6). In operation 716, the data stored (e.g., using the storage module 118A-N of FIG. 1) may be retrieved (e.g., using the retrieval module 216 of FIG. 2) according to the chronological sequence 608.

Figure 8:
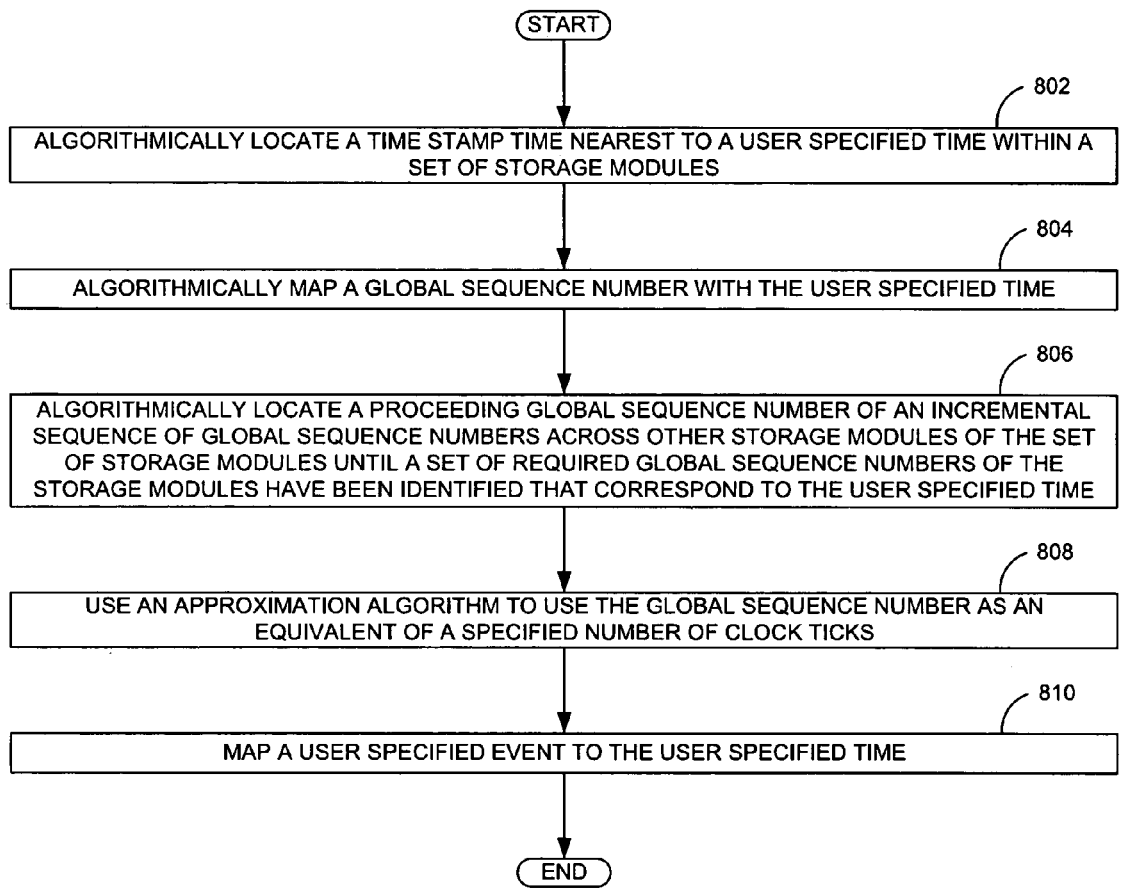
FIG. 8 is a process flow of mapping a user specified event to the user specified time.
Figure 9:
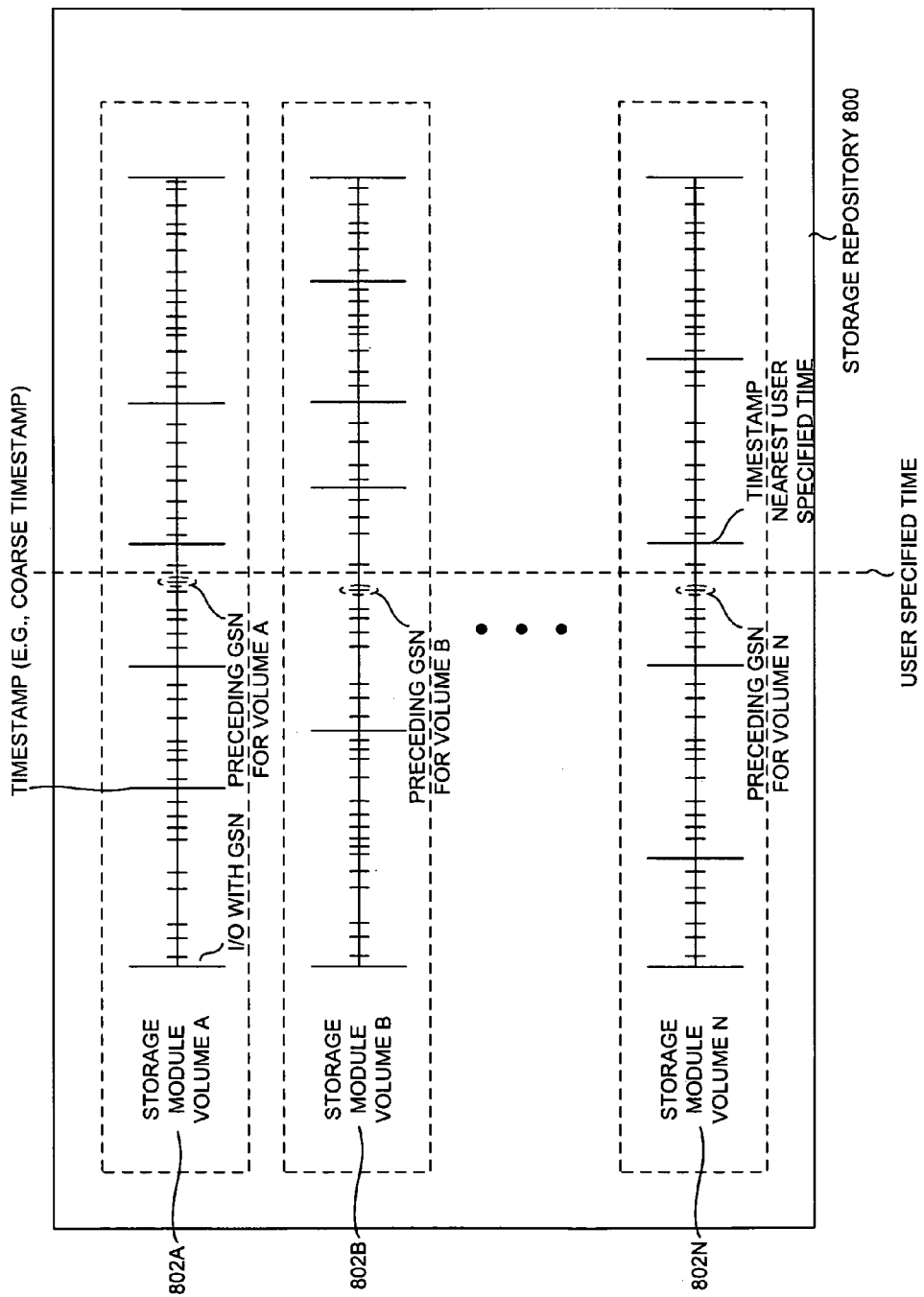
FIG. 9 illustrates a storage repository, according to one embodiment

FIG. 8 is a process flow of mapping a user specified event to the user specified time. In operation 802, a time stamp time nearest to a user specified time may be algorithmically located within a set of storage modules. In operation 804, a global sequence number may be algorithmically mapped with the user specified time. In operation 806, a proceeding global sequence number of an incremental sequence of global sequence numbers may be algorithmically located (e.g., as illustrated in FIG. 9) across other storage modules of the set of storage modules until a set of required global sequence numbers of the storage modules have been identified that correspond to the user specified time. In operation 808, an approximation algorithm may be used to use the global sequence number as an equivalent of a specified number of clock ticks. In operation 810, a user specified event may be mapped to the user specified time.

FIG. 9 illustrates a storage repository, according to one embodiment. Particularly, FIG. 9 illustrates a storage repository 800, a storage module volume A 802A, a storage module volume B 802B, and a storage module volume N 802N, according to one embodiment.

The storage repository 800 may include N storage module volumes that may have time stamps. The storage module volume A 802A, the storage module volume B 802B, a storage module volume N 802N, etc. may be the storage module volumes that may include packets of information and each of the storage module volume may have a timestamp.

In example embodiment, FIG. 9 may illustrate the storage repository 800 which may include the storage module volumes. Each of the storage module volumes may have a timestamp (e.g., may be a coarse timestamp). The user may specify a time line for packets (e.g., volumes). There may be GSN (Global Sequence Number) (e.g., that may be preceding) for the every storage module volume that may be very close to the user specified time.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the write ordering module 116, the storage module 118A-N, the observation module 124, the processing module 200, the analysis module 202, the substitution module 204, the setting module 206, the association module 210, the sequence module 212, the collation module 214, the retrieval module 216, the interface module 302, the monitor module 304, the identifier module 306, the write module 308, the comparison module 310, the assembly module 312, and/or the synchronization module 314 of FIGS. 1-7 may be enabled using software and/or using transistors, logic gates, and electrical circuits (e.g., application specific integrated ASIC circuitry) such as a write ordering circuit, a storage circuit, an observation circuit, a processing circuit, a analysis circuit, a substitution circuit, a setting circuit, an association circuit, a sequence circuit, a collation circuit, a retrieval circuit, an interface circuit, a monitor circuit, a identifier circuit, a write circuit, a comparison circuit, a assembly circuit, a synchronization circuit and/or other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A system of a backup server, comprising:
a processing module configured to examine a received data that is timestamped with a sequence of characters denoting a time according to a clock source through a computer processor associated with the backup server, the timestamp associated with the data received through the computer network from at least one of a client device and other servers, the received data from at least one of the client device and the other servers is stored in the backup storage through the backup server as a part of an information backup service offered by the backup server, wherein the received data is associated with a write I/O received at the backup server from the client device;

an analysis module configured to determine through the computer processor that the data having the timestamp received from at least one of a client device and other servers has been time stamped at an earlier time than the timestamp associated with another data previously received through the computer network from at least one of a client device and other servers;

a substitution module of the backup server to provide an incremental sequence number that is placed along with the timestamp of the other data denoting a relative time interval when a clock runs in a reverse order using an algorithm until a new data is received that includes a future timestamp with a timestamp later than a timestamp of the other data, wherein the incremental sequence number is generated through the backup server, wherein when a granularity of an increment of a timestamp associated with the data received from client device through the computer network cannot be used to delineate an order of the data associated with the I/O from the client device, then the sequence number is also used to determine the accurate location of the data having the timestamp from the client device stored in the backup storage, the time stamp is associated with the received data that is stored in the backup storage through the backup server; and a storage module to store the data in a data storage medium of the backup server, wherein the storage module to store the data in a continuous data protection repository for a threshold value such that the data is persistently stored, wherein the threshold value is an amount of time, an allocated storage space, an available storage space.

2. The system of claim 1 wherein a sequence number is a global sequence number that increments across a plurality of sources of the data, and wherein the sequence number is changed based on an event in a network associated with the backup server, wherein the event is at least one of a write I/O being received and a shutdown event in the network, wherein the global sequence number is used for the new data received when the timestamp of the data time stamped with a sequence of numbers is unavailable.

3. The system of claim 1 wherein the sequence number is an incremental value timestamp generated by incrementing the timestamp of the other data previously received.

4. The system of claim 3 further comprising:
a setting module to reset the incremental sequence number to a first value when the new data is received that includes the future timestamp with the later timestamp later than the timestamp of the other data.

5. The system of claim 1 wherein the sequence number is a relative time interval value placed with the timestamp of the other data denoting a relative time interval according to an independent clock source.

6. The system of claim 1, further comprising:
an association module to associate the incremental sequence number with an equivalent timestamp; and
a sequence module to algorithmically determine a chronological sequence and arrange a set of data based on successive ones of the incremental sequence number and another set of data not based on successive ones of the incremental sequence number according to the chronological sequence.

7. The system of claim 6, further comprising: a collation module to collate a plurality of sets of data based on successive ones of the incremental sequence number of a plurality of storage modules and a plurality of the sets of data not based on successive ones of the incremental sequence number of the plurality of storage modules according to the chronological sequence.

8. The system of claim 7, further comprising: a retrieval module to access the data stored according to the chronological sequence through a lookup algorithm that examines the timestamp of the other data to determine an accurate location of a target data in a data stream between the other data and a plurality of sequence numbers to recover at least one of a within a volume and across volumes to the accurate location of the target data.

9. A system of a backup server, comprising:
an interface module configured to collect a data packet with a timestamp received from a computer network, the computer network coupled to at least one of the client device and other servers that sends the data packet with the timestamp to store the data packet through the backup server, wherein the data packet is associated with a write I/O received at the backup server from the client device;
a monitor module configured to determine through a processor if the timestamp is received from the computer network in a proper chronological sequence by comparing the timestamp of the received data packet to a timestamp of a previously received data packet;
an identifier module to affix through a processor of the backup server a relative sequential identifier to the timestamp of the previously received data packet when a subsequent timestamp is received from the computer network with a chronological value that is less than the previously received timestamp and until a later timestamp is received from the computer network with the chronological value that is greater than the previously received timestamp, the chronological value of the timestamp of the received data packet is less than the previously received timestamp when a clock associated with the timestamp of the received data packet runs in a reverse order; and
a write module to store the data packet to a data storage medium, wherein the storage module to store the data in a continuous data protection repository for a threshold value such that the data is persistently stored, wherein the threshold value is an amount of time, an allocated storage space, an available storage space.

10. The system of claim 9, further comprising: a comparison module to equate the timestamp with the relative sequential identifier with a corresponding timestamp.

11. The system of claim 10, further comprising: an assembly module to assemble a set of data packets with timestamps with the relative sequential identifier with the set of data packets with timestamps without the relative sequential identifier into the proper chronological sequence.

12. The system of claim 11, further comprising: a synchronization module to chronologically synchronize the plurality of data packets of a plurality of data storage mediums into the proper chronological sequence.

13. A method of storing data comprising:
examining a data timestamped with a sequence of characters denoting a time according to a clock source, the data is collected from a computer network, the computer network to receive the data from at least one of a client device and other servers, wherein the received data is associated with a write I/O received at the backup server from the client device;
determining that the data has been timestamped at an earlier time than another data previously received;
providing the data an incremental sequence number generated by incrementing the timestamp of the other data previously received until a new data is received that includes a future timestamp with a later timestamp than the timestamp of the other data; and storing the data, the incremental sequence number placed along with the timestamp of the other data previously received.

14. The method of claim 13, wherein the incremental sequence number is an incremental number placed with the data.

15. The method of claim 14, further comprising: resetting the incremental sequence number to a first value when a new data is received that includes a future timestamp with the later timestamp than the timestamp of the other data.

16. The method of claim 15, wherein the incremental sequence number is a relative time interval value placed with the timestamp of the other data denoting a relative time interval according to an independent clock source.

17. The method of claim 15, further comprising: associating the incremental sequence number with an equivalent timestamp.

18. The method of claim 17, further comprising: algorithmically determining a chronological sequence and arranging a set of data based on successive ones of the incremental sequence number and another set of data not based on successive ones of the incremental sequence number according to the chronological sequence.

19. The method of claim 18, further comprising: retrieving the data stored according to a chronological sequence.

20. A method of a backup server comprising:
algorithmically locating a time stamp time nearest to a user specified time within a set of storage modules;
algorithmically mapping a global sequence number with the user specified time; and
algorithmically locating a proceeding global sequence number of an incremental sequence of global sequence numbers across other storage modules of the set of storage modules until a set of required global sequence numbers of the storage modules have been identified that correspond to the user specified time, wherein the storage module to store the data in a continuous data protection repository for a threshold value such that the data is persistently stored, wherein the threshold value is an amount of time, an allocated storage space, an available storage space.

21. The method of claim 20 further comprising using an approximation algorithm to use the global sequence number as an equivalent of a specified number of clock ticks.

22. The method of claim 20 further comprising mapping a user specified event to the user specified time.

* * * * *